Patented Apr. 25, 1939

2,155,981

UNITED STATES PATENT OFFICE 2,155,981

COMPOSITION TO INCREASE THE EFFICIENCY OF INTERNAL COMBUSTION ENGINES

Otto W. Schmidt, Kansas City, Mo., assignor, by mesne assignments, to M. W. Borders, Jr., Kansas City, Mo.

No Drawing. Application November 23, 1936, Serial No. 112,442

5 Claims. (Cl. 87—9)

This invention relates to a new and useful composition of matter, particularly adapted for increasing the efficiency of internal combustion engines.

The principal object of this invention is the production of a composition of matter containing finely divided exfoliated vermiculite, which when introduced in to the cylinders of an internal combustion engine, will cause said engine to function more efficiently for a long period of time.

Another object of the present invention is the provision of a homogeneous composition of matter in a semi-liquid form, containing finely divided exfoliated vermiculite, which will not settle out when the composition is at rest.

A further object of this invention is the provision of a composition of matter which, when introduced into the combustion chamber of an internal combustion engine, will produce a smooth, hard, metallic coating on the cylinder and piston walls, to fill irregularities of the contacting surfaces and to provide properly spaced, smooth working surfaces for the relatively moving parts.

A still further object of this invention is the provision of a composition which, when introduced into the cylinders of combustion engines, will produce a coating on the engine parts, and prevent to a marked degree the accumulation of carbon thereon.

Further objects of this invention will appear during the course of the following specification.

Actual tests have shown that different forms of mica such as vermiculite, jeffercite, zonolite, biolite, etc, may be used in this composition, however vermiculite has proven to be the most suitable because it is more easily divided into the desired microscopic plate-like particles.

Vermiculite to be used in the present composition is first fully expanded by heating, and then ground, in the presence of water, to fine plate-like particles, of dimensions suitable for passing through a two hundred mesh screen. Vermiculite thus treated may be reduced to plate-like particles much smaller than required to pass through a two hundred mesh screen. It is due to the fact that this vermiculite is reduceable to plate-like particles of such extremely small dimensions that it functions in this composition in a manner not obtainable by other powdered materials such as graphite, unexfoliated vermiculite, talc, etc., heretofore used.

This finely divided vermiculite is preferably mixed with sulphonated castor oil and a light lubricating oil to form a homogeneous semi-liquid composition suitable for application to the interior of the combustion chamber of an internal combustion engine.

The sulphonated castor oil is a water soluble composition and when mixed with the exfoliated vermiculite and lubricating oil and agitated quickly, causes the formation of a homogeneous mass which will not settle out when the composition is permitted to be at rest for a long period of time.

A composition of matter made in accordance with this invention is as follows:

Place together approximately two pounds sulphonated castor oil, seventy-seven pounds of lubricating oil, and sixteen pounds of fully expanded vermiculite, that will pass through a two hundred mesh screen, containing twenty-four pounds of water, and stir sufficiently to form a homogeneous mass. The water is usually introduced into the vermiculite during the wet grinding process, whereby the vermiculite is reduced to its extremely small plate-like particles.

All the vermiculite must be completely exfoliated, otherwise the presence of unexfoliated particles in the finished composition would be expanded after its injection into the engine cylinder and prevent proper functioning of the exfoliated vermiculite.

When so compounded and mixed the ingredients will not settle out, and the composition will remain uniform in structure for an indefinite period of time so that like volumes of the material discharged from the container will include substantially like amounts of the vermiculite.

Variations may be made in the relative proportions of ingredients in the composition without departing from the spirit of the invention. The quantity of lubricating oil in the composition described above may be varied from eight to twelve gallons, with the resultant effect of only changing the relative amount of vermiculite in a unit volume of the composition.

While the complete functioning of the composition when placed in the cylinder of an internal combustion engine is not known, yet by actual tests it has been found that it coats the parts with a film of highly lubricating qualities, fills the irregularities in the metal parts to produce smooth working surfaces, much of the accumulated carbon is softened and caused to break away from the metal parts. The deposit of a film of vermiculite on the working parts of the engine also greatly reduces the possibility of further carbon deposits.

The vermiculite deposit becomes very hard and will remain for a long period of time, thereby effecting a conditioning of the engine parts, to increase the efficiency of the engine. The vermiculite coating of the parts not only builds up the walls with a metal, to produce a better and closer fitting of the parts, thereby increasing the compression, but also produces surfaces which are smooth, thereby eliminating much of friction between the movable parts.

What I claim is:

1. A composition of matter to increase the efficiency of internal combustion engines, consisting of water-moistened finely divided exfoliated vermiculite, lubricating oil, and sulphonated non-mineral oil intermixed to form a homogeneous mass.

2. A composition of matter to increase the efficiency of internal combustion engines, consisting of water-moistened finely divided exfoliated vermiculite, lubricating oil and sulphonated vegetable oil intermixed to form a homogeneous mass.

3. A composition of matter to increase the efficiency of internal combustion engines, consisting of water-moistened finely divided exfoliated vermiculite, a relatively large quantity lubricating oil, and a relatively small quantity of sulphonated castor oil intermixed to form a homogeneous mass.

4. A composition of matter to increase the efficiency of internal combustion engines, consisting of the following materials in substantially the following proportions: sixteen (16) pounds of finely divided expanded vermiculite moistened with twenty-four (24) pounds of water, seventy-seven (77) pounds of lubricating oil, and two (2) pounds of sulphonated castor oil intermixed to form a homogeneous mass.

5. A composition of matter to increase the efficiency of internal combustion engines, consisting of ten (10) to twenty (20) pounds of finely divided exfoliated vermiculite moistened with about one hundred and fifty percent (150%) of its weight by water, one (1) pound of three (3) pounds of sulphonated vegetable oil, and seventy (70) pounds of light hydrocarbon lubricating oil.

OTTO W. SCHMIDT.